June 17, 1969  M. W. HUFF  3,449,892
SEA PLANT HARVESTING APPARATUS
Filed Dec. 29, 1965
FIG__1
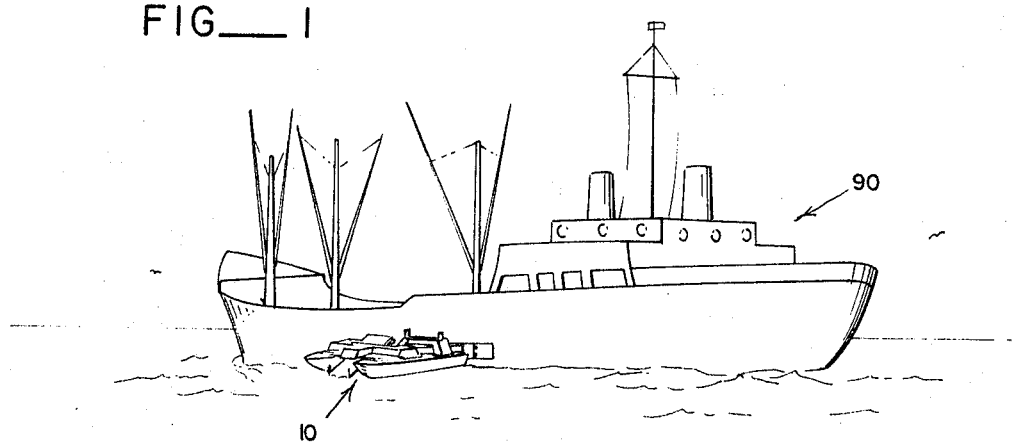
FIG__2
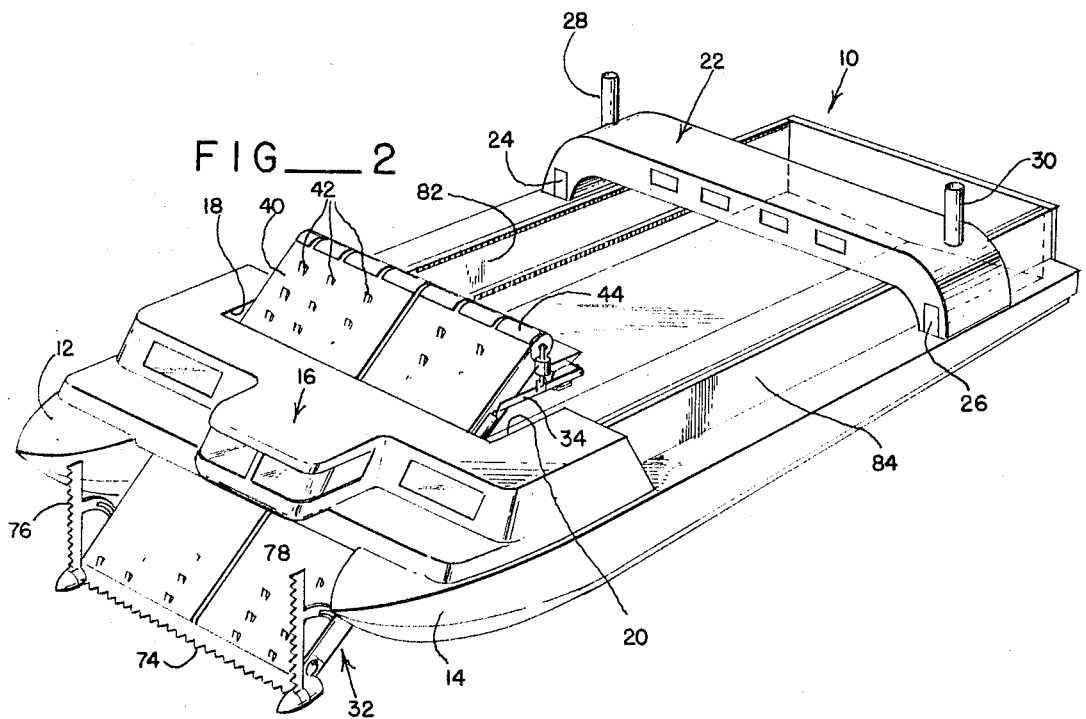
M. WALTER HUFF
INVENTOR.
ATTORNEYS June 17, 1969
M. W. HUFF
3,449,892
SEA PLANT HARVESTING APPARATUS
Filed Dec. 29, 1965
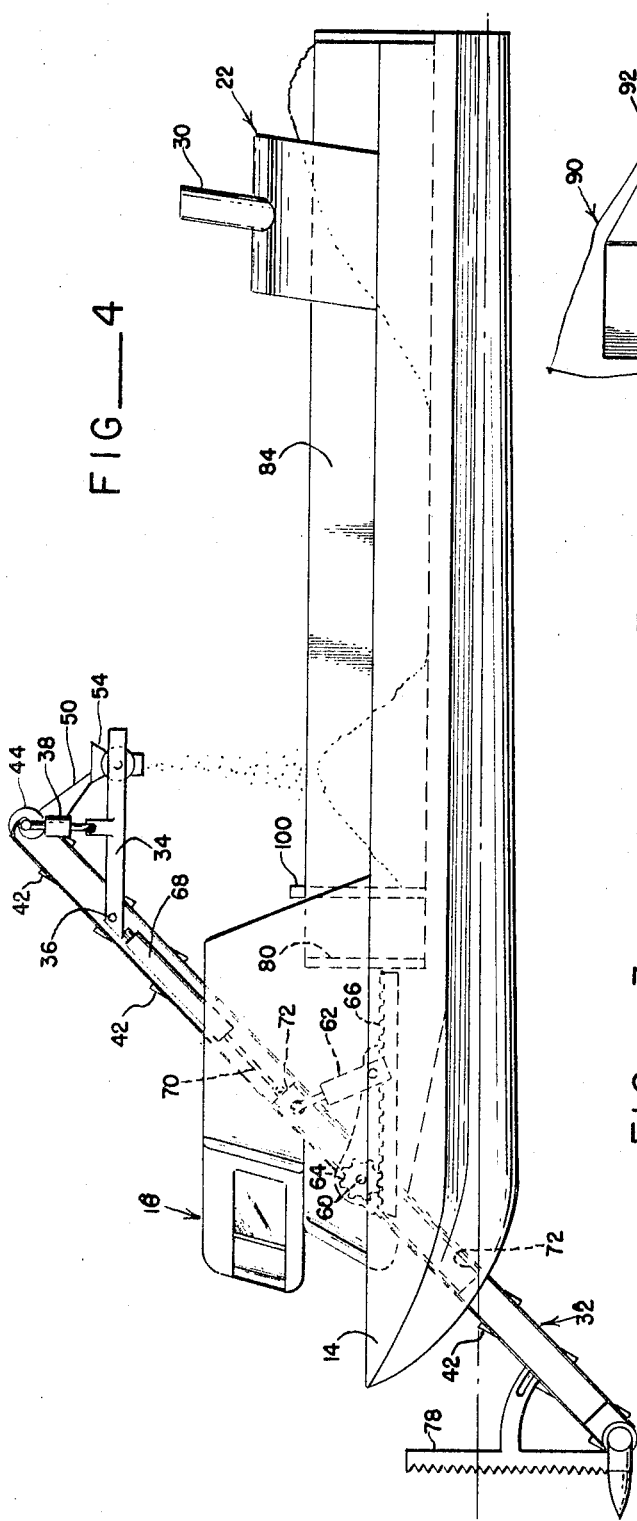
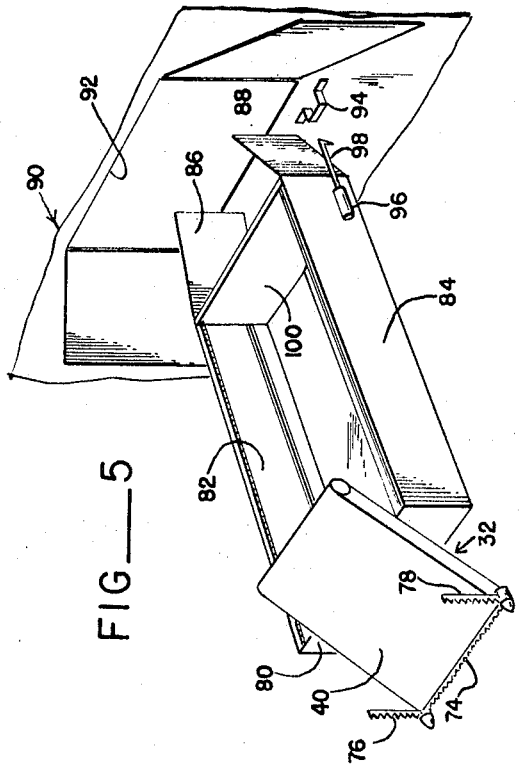
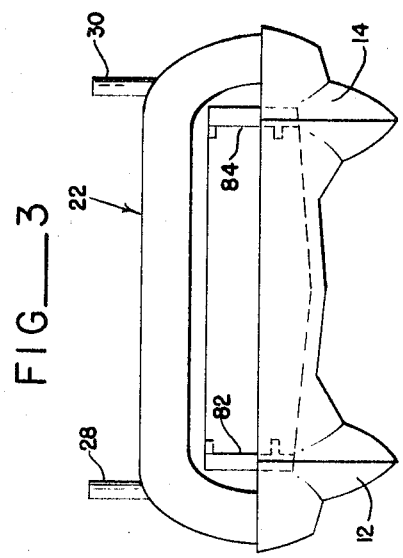
M. WALTER HUFF
INVENTOR.
ATTORNEYS June 17, 1969        M. W. HUFF        3,449,892
SEA PLANT HARVESTING APPARATUS
Filed Dec. 29, 1965        Sheet 3 of 3
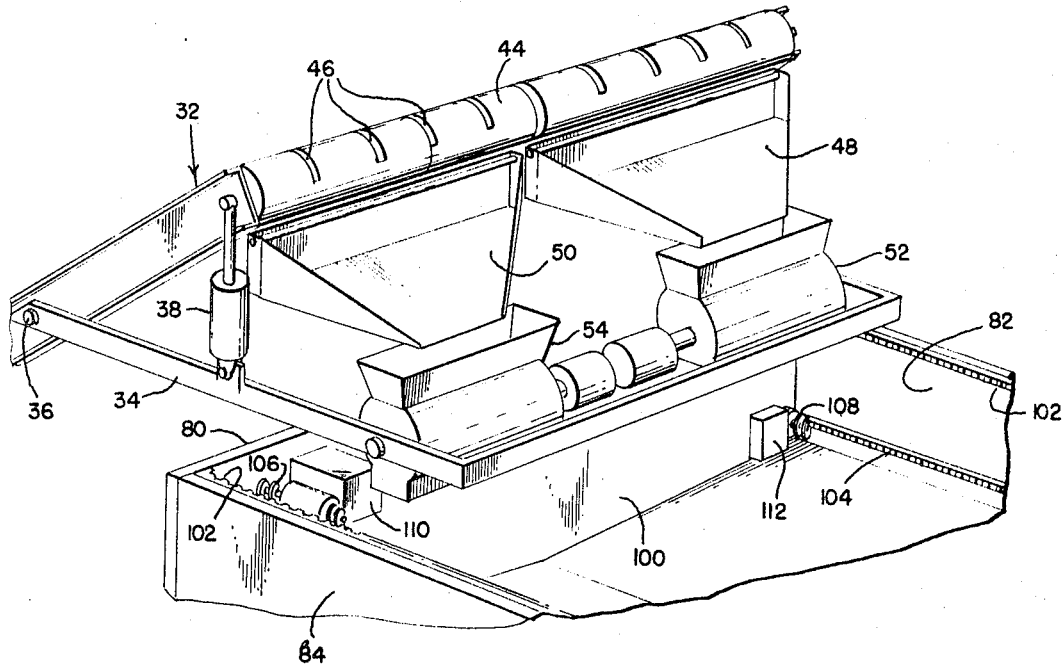
FIG___6
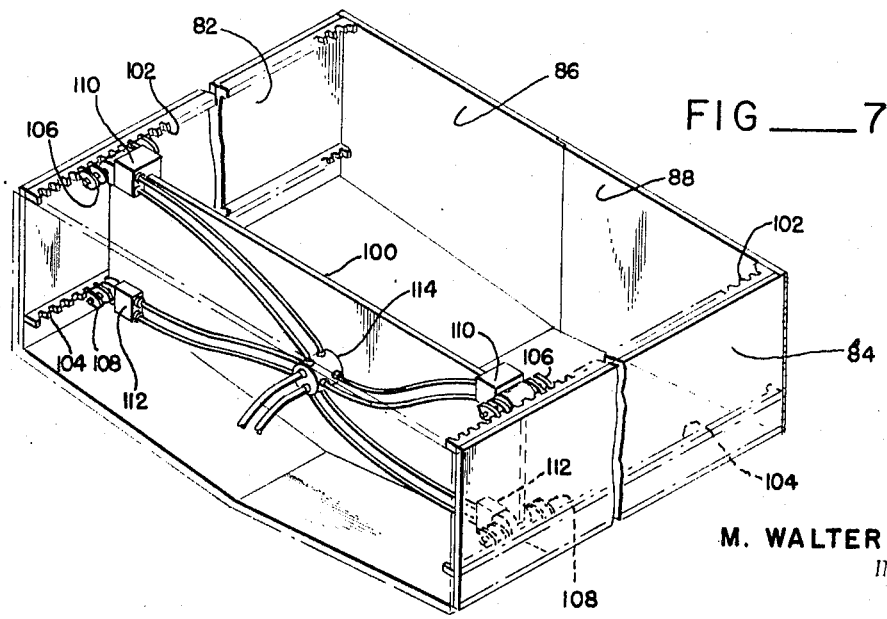
FIG___7
M. WALTER HUFF
INVENTOR.
BY *Graybeal, Cole & Barnard*
ATTORNEYS United States Patent Office 3,449,892
Patented June 17, 1969

3,449,892
SEA PLANT HARVESTING APPARATUS
Major Walter Huff, West Vancouver, British Columbia, Canada, assignor, by mesne assignments, to Sea-Chem Industries Ltd., Vancouver, British Columbia, Canada, a corporation of British Columbia
Filed Dec. 29, 1965, Ser. No. 517,385
Int. Cl. A01d 45/08
U.S. Cl. 56—9                                        6 Claims

ABSTRACT OF THE DISCLOSURE

Sea plant harvesting apparatus having a catamaran type hull. At the forward end of the vessel is a conveyor frame located between the two hulls of the catamaran. At the lower end of the conveyor are cutting blades. The conveyor pivots so that the angle of incline can be varied, it moves in a forward and aft direction without changing its angle of incline, and moves up and down in the plane in which it is disposed so that the depth to which it will cut can be varied without changing the angle of incline. A hold means extends from the stern of the vessel towards the forward portion with the forward part of the hold located under or below the upper or discharge end of the conveyor. The hold contains means for moving severed sea plants aft and for discharging them out the aft end of the vessel when the stern wall of the hold is open.

---

This invention relates to new and novel contributions in the art of sea plant harvesting. More particularly does this invention pertain to new and novel apparatus for harvesting sea plants such as kelp.

Equipment that is presently used in the sea plant harvesting industry is quite antiquated. Basically, harvesting is done with an ocean going vessel equipped with cutter bars installed at the bottom of a continuous type conveyor mounted on the vessel and extending downwardly at an angle into the water. The harvested kelp is taken up on the conveyor and deposited in an open hold where it is stored until the vessel is loaded. As soon as the hold is filled to capacity, the vessel leaves the kelp beds and steams directly for its base which may be many miles away. There the kelp is unloaded for processing. The kelp is ground in the first stages of processing and from there further processed to extract chemicals and other valuable by-products. The vessels as currently used are equipped with buckets and draglines to move the kelp from the end of the hold beneath the conveyor to the far end. Similarly when the harvester vessel is unloaded, buckets and clams attached to cranes at dockside laboriously scoop the kelp out of the hold resulting a a slow time-consuming operation. Another drawback of current harvesting equipment is the use of conveyors which are not movable in and out of the water in the plane on which the conveyor is disposed. In other words, in order to extend the lower end of the conveyor deeper into the water, it is necessary to pivot the conveyor. In order to attain maximum depth the angle of incline of the conveyor becomes very acute with resultant high loading of the drive equipment and decreased carrying capacity of the conveyor. Another disadvantage of existing equipment is that the propellers of the vessel are often at the same end of the hull as the conveyor. If the vessel propellers are at the same end of the hull as the conveyor, there is a tendency for the propellers in being close to the cutting bar to tend to pull the kelp under the conveyor pickup. This results because the vessel must be moving astern into the kelp bed in order to operate. In some instances, the conveyors are movable in and out of the water in the plane in which they are disposed, but are mounted at a fixed angle. Such limited equipment with some or all of the disadvantages enumerated, may be sufficient for some areas. However, in such waters as the west coast of Canada the tidal currents are strong, tidal variations are extreme, and there are myriads of rock pinnacles and islands. Therefore, a harvesting vessel working in the rich kelp beds that abound off the coasts of British Columbia and Vancouver Island must be extremely versatile and maneuverable in order to cope with the environment in which the sea plants grow. An additional and serious consideration in the harvesting of kelp is the need for keeping the kelp as wet as possible until deposited on shore at the processing plant. Maintaining hydration facilitates grinding and maximizes the alginate yield of the plants. The equipment which is now used must first harvest the kelp and if it is any distance from the shore-based plant, requiring a long run from beds to base, the kelp will dehydrate.

This invention seeks to overcome the deficiencies and disadvantages of conventional and heretofore known equipment and methods as briefly set forth above. The apparatus with which this invention is concerned embraces an ocean-going hull, preferably but not necessarily of the catamaran type, wherein the forward end of the harvester vessel is provided with a conveyor structure mounted at an angle and extending from a point below the keel of the hull to a point above the vessel's superstructure. At the lower end of the conveyor is a horizontal cutting bar. At each end of the horizontal bar is a generally upstanding or vertical cutting bar. The horizontal bar is adjustable relative to the conveyor angle of incline so that it moves in a generally horizontal plane through the water. Similarly, the vertical cutting bars at each end of the horizontal cutting bar are adjustable so as to remain in an essentially vertical position regardless of the angle of incline of the conveyor. The conveyor is movable in fore and aft directions through a limited distance. It may also be moved up and down in the plane in which it is disposed and also pivoted so that its angle of incline may be varied. At the upper end of the conveyor is a stripping comb whereby the flights or cleats on the conveyor are wiped clean of kelp when they turn under at the upper end of the conveyor. The upper end of the conveyor discharges the freshly cut kelp into grinders which then comminute or coarse grind the plants. The ground or comminuted kelp and sea plant material then drops from the grinder discharges into the hold of the vessel. The hold is provided with a transversely disposed movable bulkhead which travels from the extreme forward end of the hold area to the extreme after end of the hold area. This bulkhead eliminates the tedious and inefficient scoop, bucket and/or dragline type of handling which characterizes conventional harvesters. When a sufficiently large pile of ground plant material has accumulated astern of the movable bulkhead, the entire pile may be pushed to the rear of the hold, and the bukhead drawn back to its original position, and the harvesting operation continued until the hold is filled to capacity. The after end of the harvester vessel is designed so it may back up to a factory ship a short distance away and be clamped to the factory vessel. The factory vessel will provide a loading door or opening with which the harvester vessel alined. The stern wall of the harvester vessel is constructed so as to be opened as soon as the harvester vessel has made its connection with the factory ship. The movable bulkhead then discharges within a matter of minutes the entire load of ground kelp into tanks in the harvester vessel which are flooded with sea water for keeping the kelp and sea plants in their desirable wet state. This highly automated, labor reducing, efficient and practical manner of cutting, grinding, storing and unloading the kelp in a factory ship represents a truly significant contribution to the industry.

Accordingly it is a feature of this invention to provide apparatus for harvesting sea plants which is simple in concept, practical and economical.

Another feature of this invention is to furnish new and novel apparatus for harvesting sea plants which minimizes the time required for loading a harvester vessel and transporting harvested sea plant material to a factory location by installing factory equipment and sea water filled storage tanks aboard an ocean going vessel.

Another feature of this invention is to supply new and novel apparatus for harvesting sea plants which because of its efficiency moves factory facilities on board a factory ship to short run distance from the sea plant beds being harvested.

Yet another feature of this invention is to provide new and novel sea plant harvesting apparatus which enables the freshly harvested sea plants to be ground aboard the harvester vessel and thus ready for storage in sea water filled tanks immediately upon being unloaded in a factory ship.

Still another feature of this invention is to provide new and novel apparatus for harvesting sea plants which utilizes unique structural and design advantages and concepts to give the harvested vessel versatility, maneuverability and reliability in various types of sea plant beds.

A further feature of this invention is to supply unique apparatus for harvesting sea plants for the production and extraction of valuable chemicals and useful by-products both from the chemicals and from sea plant residue.

A still further feature of this invention is to furnish unique apparatus for harvesting sea plants which enables utilization of seaweed beds considered to be inaccessible to hitherto known harvesting methods and devices.

An even further feature of this invention is to provide new and novel apparatus for harvesting sea plants which reduces labor costs and shortens harvesting operations.

An even further feature of this invention is to provide new and novel apparatus for harvesting sea plants which is almost totally automatic and which represents a great step forward in the art and in the industry.

These and other objects, features and advantages reside in the details of construction and operation in the apparatus more fully hereinafter described and claimed. Reference will be had to the accompanying drawings, wherein like numerals will refer to like parts throughout, in which:

FIGURE 1 is an environmental view showing a harvester vessel discharging its load of harvested kelp into the factory ship;

FIGURE 2 is a view in perspective showing the harvester vessel in its overall detail;

FIGURE 3 is a front elevational view, basically schematic, of the harvester vessel and the manner in which its cargo hold is arranged with respect to the double or catamaran type hull;

FIGURE 4 is a side elevational view of the harvester vessel showing further details of its construction;

FIGURE 5 is a schematic view of the manner in which the harvester vessel engages the factory ship for the discharge of ground sea plants into the cargo tanks of the factory ship;

FIGURE 6 is a partial perspective view of the upper end of the conveyor showing the disposition of the grinder devices on the grinding table; and FIGURE 7 is a partial perspective view showing additional details of the cargo hold and the movable bulkhead therein.

Referring now to the drawings it will be seen that the harvester vessel, generally referred to by the number 10, is constructed on a catamaran type hull having hull sections 12 and 14. While the preferred type of hull would be catamaran, because of greater stability against roll in heavy seas, it should be kept in mind that the essential features of this invention could be incorporated in conventional single hulls. At the forward end of the hull is a control bridge structure extending generally from side to side of the vessel and containing the various control stations required for operating the harvester. It will be seen that the forward control bridge and cabin structure is slotted as at 16 to permit the conveyor, to be described more fully hereinatfer, to pivot and move fore and aft. With the forward superstructure 16 designed as shown, windows may be placed in the control bridge for direct visual observation of the hold, the conveyor, and the grinder structures to make control of these elements considerably more convenient. At the after end of the vessel is stern bridging structure 22. The stern bridging structure will contain intake vents and filters for air supply to the port and starboard engines, as well as containing access hatches 24 and 26 and engine stacks 28 and 30.

The forward end of the vessel is provided with a large rectangular conveyor frame, generally designated by the number 32, which is disposed at an angle so that it extends generally from a point above the superstructure to a point below the keel of the boat. Precise dimensions of the conveyor frame will be determined by the depth to which the lower end of the conveyor must be lowered into the water and the height to which it must extend in order to place the upper end of the conveyor over the forward end of the hold. The upper portion of the conveyor is provided with a grinding table 34 which is designed to be mounted in a generally horizontal plane below the upper end of the conveyor frame. Table 34 is hinged to the conveyor frame as at 36 and is provided with a means such as cylinder 38 for maintaining the grinding table 34 in an essentially horizontal plane regardless of the angle of incline of the conveyor frame 32. The conveyor is further provided with continuous conveyor belt 40 with cleats or lugs 42 thereon for engaging the cut seaweed and carrying it to the top of the conveyor. At the upper end of the conveyor is a comb mechanism 44 with slots 46 therein into which lugs or cleats 42 pass as belt 40 turns around rollers at the upper end of the frame. Lugs 42 and comb 44 coact so as to wipe the sea plant material off the lugs forcing it to drop into hoppers or chutes 48 and 50. The chutes or hoppers 48 and 50 direct the harvested seaweed into grinders 52 and 54 supported on the grinding table 34. The grinders 52 and 54 may be of any appropriate type, for grinding or comminuting the sea plant material. Ball type grinders would be one type of device acceptable to this specific operation. After grinding the ground sea plant material drops out of the underside of the grinders and into the cargo hold.

The conveyor frame is supported in such a way that it can be maneuvered by thre separate and distinct actions. A central supporting point or trunnion 60 allows the conveyor frame to be pivoted through an arc of approximately 30°, or more if needed, primarily by employing a hydraulic cylinder as at 62. A pinion 64 and rack 66 allow the conveyor to be moved fore and aft through a limited distance. It is also necessary that the conveyor be capable of being raised and lowered thruogh the angled plane in which it is disposed. Thus, a hydraulic cylinder 68 attached to the main side member of the conveyor frame has piston 70 attached to a guide and support frame member 72 which is fixed against up and down movement. The cylinder piston 70 need only be extended to slide the main conveyor structure either upwardly or downwardly as operating conditions require. The versatile maneuverability features of the conveyor, together with a self-leveling grinder table, enable the harvester to cope with many conditions in operation.

The lower end of the conveyor frame is provided with a horizontal cutting bar 74 and at each side of the conveyor are upstanding generally vertically disposed cutter bars 76 and 78. The vertical cutter bar as well as the horizontal cutter bars are pivotal to allow adjustment in order to keep them in the desired plane. In other words, the vertical cutter bars 76 and 78 regardless of the incline of the conveyor can be kept generally vertical. Similarly the horizontal cutting bar extending across the lower end of the conveyor can be kept in a generally horizontal cutting plane for most efficient cutting. It will be understood that it is desirable when the vessel is underway, after being loaded, to raise the conveyor 32 out of the water to eliminate its drag on the forward speed of the vessel and also to provide easy access to the lower end of the conveyor for replacement and repair of the cutter bars and other structural elements.

The cargo hold of the harvester vessel can be seen to extend generally from the after part of the forward superstructure or bridge to the extreme stern of the hull. Preferably the floor of the hold is inclined as shown in FIGURES 3 and 6 for drainage purposes. A forward permanent bulkhead 80 is joined by side bulkheads 82 and 84. The stern opens as in the form of hinged doors 86 and 88 or in some other way for quickly folding or sliding the stern bulkhead away from the hold. In this way the stern bulkhead opens the hold so that the movable bulkhead can force the kelp into the factory ship. The factory ship 90 has opening 92 in its hull to receive the stern of havester vessel 10. A clamping arrangement such as is shown in FIGURE 5, embracing brackets 94 and cylinder 96 with hooked piston rod 98, enables the harvester vessel 10 to be held securely to ship 90 during the unloading operation.

The transverse bulkhead 100 extends across the beam of hold between walls 82 and 84, and conforms to the cross-sectional configuration of the hold area. Means for moving the bulkhead along the lengths of the hold area, both fore and aft, could take many forms. However, considerable driving force on the bulkhead 100 is necessary in order to move the material out of the hold during the unloading operations, and for that matter when the bulkhead is used during the harvesting operation in order to trim the plant material as it is loading into the hold. To that end the side walls of the hold are provided at the upper edge and near the lower edge with gear racks 102 and 104. Worm type or screw gears 106 and 108 engage the gear racks for providing the moving force to bulkhead 100. The screws or worms 106 and 108 are driven by hydraulic motors for various reasons among which is the ability to control the speed at which the bulhead moves while at the same time maintaining a constant torque output. Other means for moving the bulkhead could certainly be devised including most obviously cable means. Other types of prime movers both electrical and mechanical could certainly be devised by those skilled in the art. The hydraulic motors 110 and 112 are connected to a distribution manifold 114 with lines running to each of the motors incorporated in bulkhead 100. The pressure input and return lines for distribution manifold 114 are kept from lying loose by coiling them on take-up reels which are located forward of the movable bulkhead at the extreme front end of the hold area.

The foregoing is merely descriptive of the preferred embodiments of this invention. Since numerous modifications and equivalents may be devised by those skilled in the art it is not desired to limit the invention to the exact construction and operation and to the exact method shown and described. Accordingly it is intended that all suitable equivalents should fall within the scope of the invention.

What is claimed is:

1. A sea plant harvesting vessel, comprising:
   (a) a hull,
   (b) a generally rectangular conveyor frame having continuous conveyor means thereon and mounted at an angle at the forward end of said hull, said conveyor frame mounted for limited pivoting movement, for limited forward and aft movement, and for limited up and down movement, said conveyor frame also having generally horizontally and vertically disposed cutter bars at the lower end thereof for contacting and severing sea plants,
   (c) a grinder table attached to the upper portion of said conveyor frame and having grinder means thereon located beneath the upper end of said continuous conveyor for receiving sea plants dropping from said continuous conveyor,
   (d) cargo hold means located beneath the grinder table and extending to the stern of said vessel for storing ground sea plants, and
   (e) a bulkhead in said hold extending from side to side thereof and movable from the forward to the stern end of said hold for forcing sea plants stored therein out the stern end of said hold.

2. The apparatus according to the structure of claim 1 and in which the stern end of said vessel cargo hold opens to permit said bulkhead to force said sea plants out of said hold.

3. The apparatus according to the structure of claim 1 in which said grinder table is pivotally supported on said conveyor frame for adjustment to a substantially horizontal position regardless of the angle of incline of said conveyor frame.

4. A sea plant harvesting vessel, comprising:
   (a) a hull,
   (b) a generally rectangular conveyor frame having continuous conveyor means thereon and mounted at an angle at the forward end of said hull, said conveyor frame mounted for and having means for imparting limited pivoting movement, means for imparting limited forward and aft movement, and means for imparting limited up and down movement, said conveyor frame also having generally horizontally and vertically disposed cutter bars at the lower end thereof for contacting and severing sea plants,
   (c) cargo hold means located aft of and beneath said conveyor frame and extending to the stern of said vessel for receiving severed sea plants directly from said continuous conveyor, and
   (d) means in said hold for forcing sea plants stored therein out one end of said hold.

5. The apparatus according to the structure of claim 4 and in which the stern end of said vessel cargo hold opens to permit said means to force said sea plants out of said hold.

6. The apparatus according to the structure of claim 4 in which a grinder table is attached to the upper portion of said conveyor frame and having grinder means thereon for receiving sea plants dropping from said continuous conveyor.

References Cited

UNITED STATES PATENTS

| | | | |
|---|---|---|---|
| 1,028,671 | 6/1912 | Brooks | 56—9 |
| 1,795,003 | 3/1931 | Allen | 56—9 |
| 2,181,863 | 12/1939 | Bell | 56—9 |
| 2,699,135 | 1/1955 | Steiner | 56—9 X |
| 3,347,029 | 10/1967 | Grinwald | 56—9 |

HUGH R. CHAMBLEE, *Primary Examiner.*